United States Patent [19]

Piggott

[11] Patent Number: 4,607,556

[45] Date of Patent: Aug. 26, 1986

[54] COUPON CUTTING MACHINE

[75] Inventor: David C. Piggott, Burlington, Canada

[73] Assignee: PCL Packaging Ltd., Oakville, Canada

[21] Appl. No.: 702,741

[22] Filed: Feb. 19, 1985

[30] Foreign Application Priority Data

Nov. 13, 1984 [CA] Canada .................................. 467688

[51] Int. Cl.4 .............................................. B23D 19/08

[52] U.S. Cl. ........................................ 83/511; 53/134; 83/512; 408/68; 408/204

[58] Field of Search ................. 83/511, 512, 509, 510; 408/68, 1 R, 204; 53/134

[56] References Cited

U.S. PATENT DOCUMENTS 3,104,564 9/1963 Hougen ................................ 408/68

FOREIGN PATENT DOCUMENTS 677100 8/1952 United Kingdom .................. 83/512

0585923 12/1977 U.S.S.R. ............................... 83/512

*Primary Examiner*—Z. R. Bilinsky

*Attorney, Agent, or Firm*—Wegner & Bretschneider

[57] ABSTRACT

An apparatus is described for cutting coupons from plastic webs. This apparatus includes a circular cutting blade movable into and out of engagement with a cutting surface. The blade and cutting surfaces are each supported so that they are self-aligning. The cutting surface comprises a series of discrete rotatable surfaces which are rotated about the axis of the cutting blade to effect the cut.

3 Claims, 10 Drawing Figures

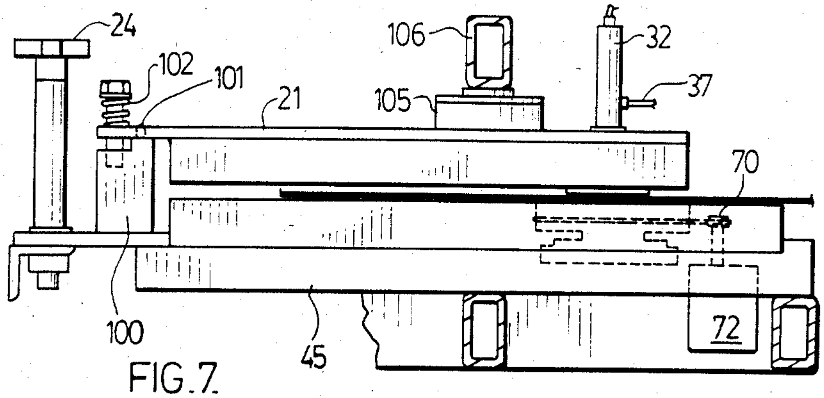
FIG. 7.
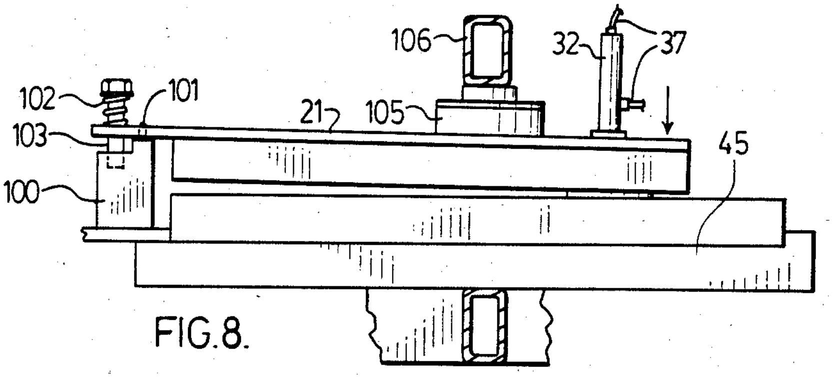
FIG. 8.
FIG. 9.
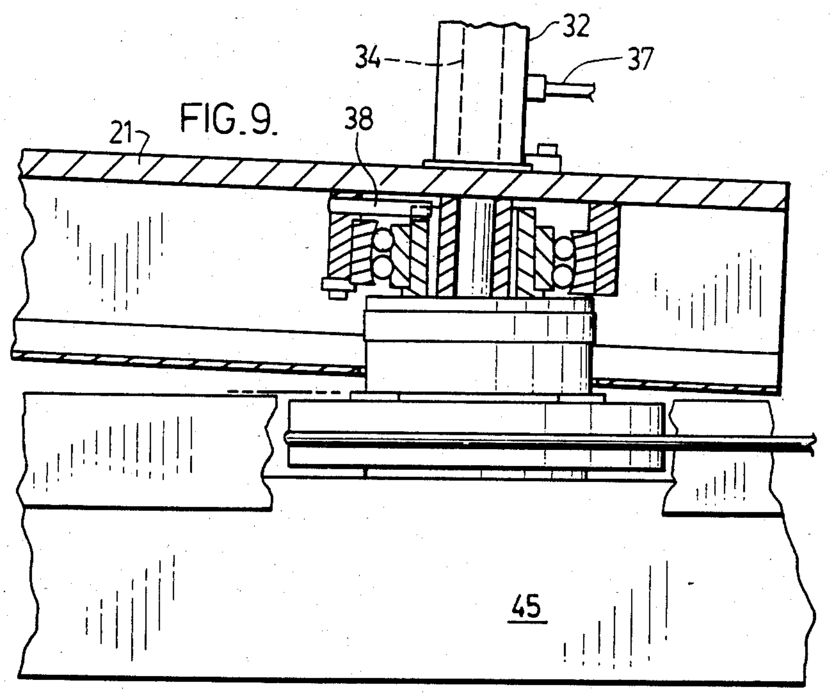

COUPON CUTTING MACHINE

BACKGROUND OF THE INVENTION

1. Field of the Invention

The present invention relates to an apparatus for cutting coupons from a plastic web material to form bag handle apertures.

2. Prior Art

It is known to form bags from tubular feed stock of thermoplastic web material wherein the tubular stock is flattened such that the side edge creases or gussets are formed which define the bottom of the bag. The web material is fed into a bag machine where it is generally cut longitudinally to form the bag handles. The bag machine subsequently cuts and seals the plastic web transversely in the direction of tube elongation to form the sides of the bag. During the manufacture of the bag, it is known to cut circular apertures from the web material to form the bag handles.

A problem associated with these bag machines is that the web material is a flexible stock which tends to cause it to flow or move in directions other than the direction it is being drawn into the bag machine. This makes it difficult to cut the bag handle apertures accurately. Further, the thinner the material used for the plastic web the more the material has a tendency to float.

As can be appreciated, it is important that the handle aperture cut into the bag be an even cut since any jagged edges or tears in the bag handle aperture are weak points which cause premature bag failure under loaded conditions.

Presently, it is common to heat the circular blade to improve the cut of the bag handle aperture. The blade is heated to allow the blade to cut through the plastic web material easier. This increases the blade wear life resulting in less down time for the bag making machine to replace blades.

In the art the term "heat window" is used to define a function of the difference between the heat required to provide an effective cut and the heat at which the plastic web adheres to the blade. With improvements in the plastic art the "heat window" has diminished to the point that it is not practical to obtain a continuous effective cut. These improvements in the plastic art have also brought cheaper, stronger and thinner plastic webs. And, apart from the "heat window" difficulties they are difficult to cut by conventional cutting methods.

The use of heat facilitates cutting and in the absence of heat the accuracy of the blade setting is very demanding. If the blade and cutting surface are not properly aligned the coupon cut is frequently ragged or incomplete.

The maintenance of cut is particularly difficult in high-speed application and where the blade is not correctly set leads to uneven wear with the necessity of frequent maintenance and replacement.

It is therefore an object of the present invention to provide an improved apparatus for cutting coupons from plastic webs which obviates the use of heated cutting blades and will cut coupons from the thinner gauge plastic webs of the present state of the plastic art.

It is another object of the present invention to provide a coupon-cutting mechanism which will permit a uniform cut and accommodate variations in the blade and surface settings to provide a more consistent cut and reduced wear on the blades.

SUMMARY OF THE INVENTION

In accordance with the present invention there is provided a mechanism for cutting coupons from plastic webs in which a cutting blade is supported on an upper arm above a cutting surface. The upper arm is movable about a pivot by a short stroke cylinder. The cutting blade is mounted on a support by means of a bearing which permits it limited movement through a vertical axis to accommodate variations in the attitude of the blade and of the cutting surface. As the blade contacts the web and the cutting surface the cutting surface itself moves on a resilient pad to provide a further accommodation in level or attitude.

The cutting surface is provided by a series of radially arranged bearings which run on a lower flexible race seated on the resilient pad.

The bearings and their support are rotated about an axis normal to the cutting blade and the web is cut by the relative rotation of the cutting surface to the blade.

Once the coupon is cut it is then ejected by a plunger and prick moving downward through the axis of the cutting surface.

BRIEF DESCRIPTION OF THE DRAWINGS

For a better understanding of the nature and objects of the present invention, reference may be had by way of example to the accompanying diagrammatic drawings in which:

FIG. 7 is a side view of the cutting apparatus of the present invention shown in the non-cutting position;

FIG. 8 is a side view of the cutting apparatus of the present invention shown in the cutting position; and FIG. 9 is a sectional view of the cutting blade showing it in the cutting position.

DESCRIPTION OF THE PREFERRED EMBODIMENT

Figure 1A:
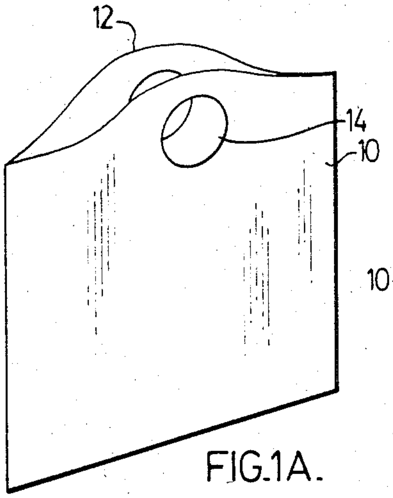
FIGS. 1*a* and 1*b* are, respectively, perspective and side views of a plastic bag.
Figure 1B:
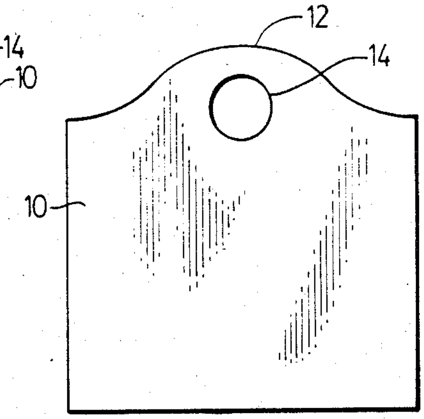

Referring to FIGS. 1*a* and 1*b* there is shown a plastic bag 10 having bag handles 12 and comprising two layers of material. A circular handle aperture 14 is shown in the bag handle 12. It is for cutting coupons such as this bag handle aperture that the present invention has been developed.

Figure 2:
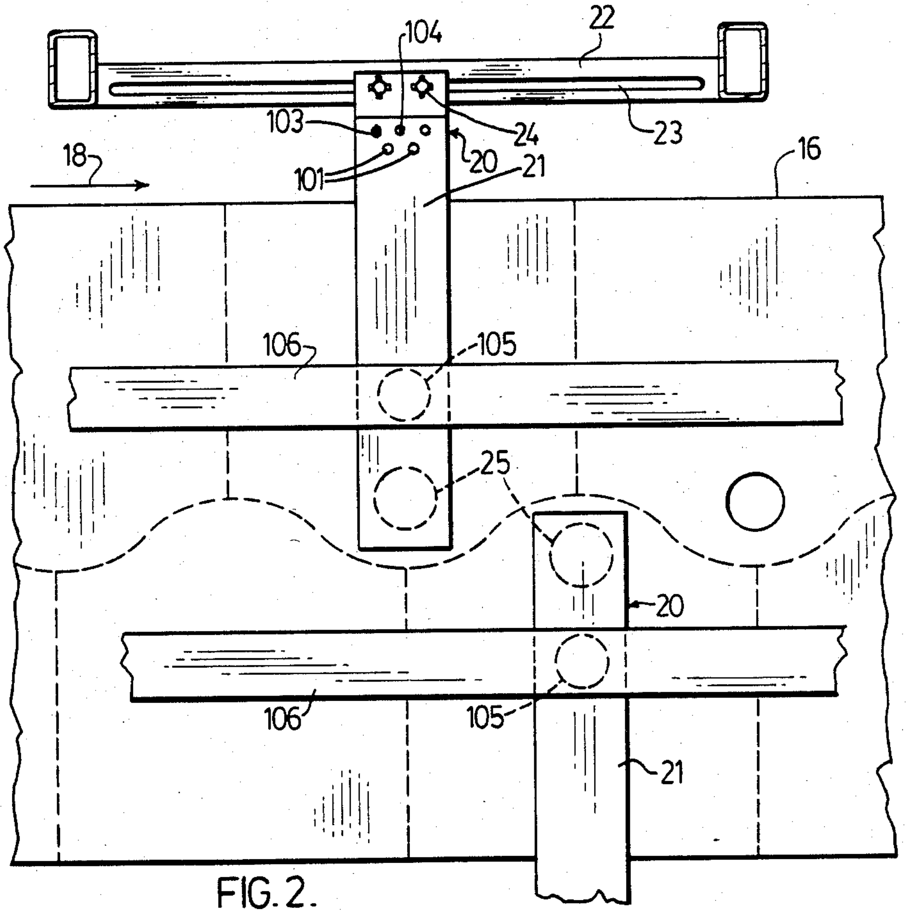
FIG. 2 is a plan view showing the cutting apparatus relative to a travelling plastic web material.

In FIG. 2 there is shown a plastic web 16 travelling in the direction of arrow 18. The coupon cutting stations embodying the present invention are indicated at 20. Each station comprises an upper arm 21 and a lower arm 45. These are movably mounted at one end on frame support 22 by engagement with slot 23. Securement is effected by bolts 24.

A mounting block 100 supports arms 21 and 45 at their outer ends. Lower arm 45 is not movable relative to block 100. The upper arm 21 comprises a lever which is supported on block 100 by a pair of pins 101, as illustrated, a pair of springs 102 on screws 103 and an adjustment screw 104 so that arm 21 may pivot about pins 101. The springs 102, as will be seen, are so mounted as to bias the remote end of arm 21 into an upward or outward engagement position. The tension and the travel may be adjusted on the springs and screw 104 to accommodate varying cutting conditions.

At the free end of each arm 21 there is carried a cutting mechanism generally indicated at 25. Between the cutting mechanism 25 and the pins 101 a short stroke cylinder 105 is mounted. Cylinder 105 is carried by a fixed frame 106.

Figure 3:
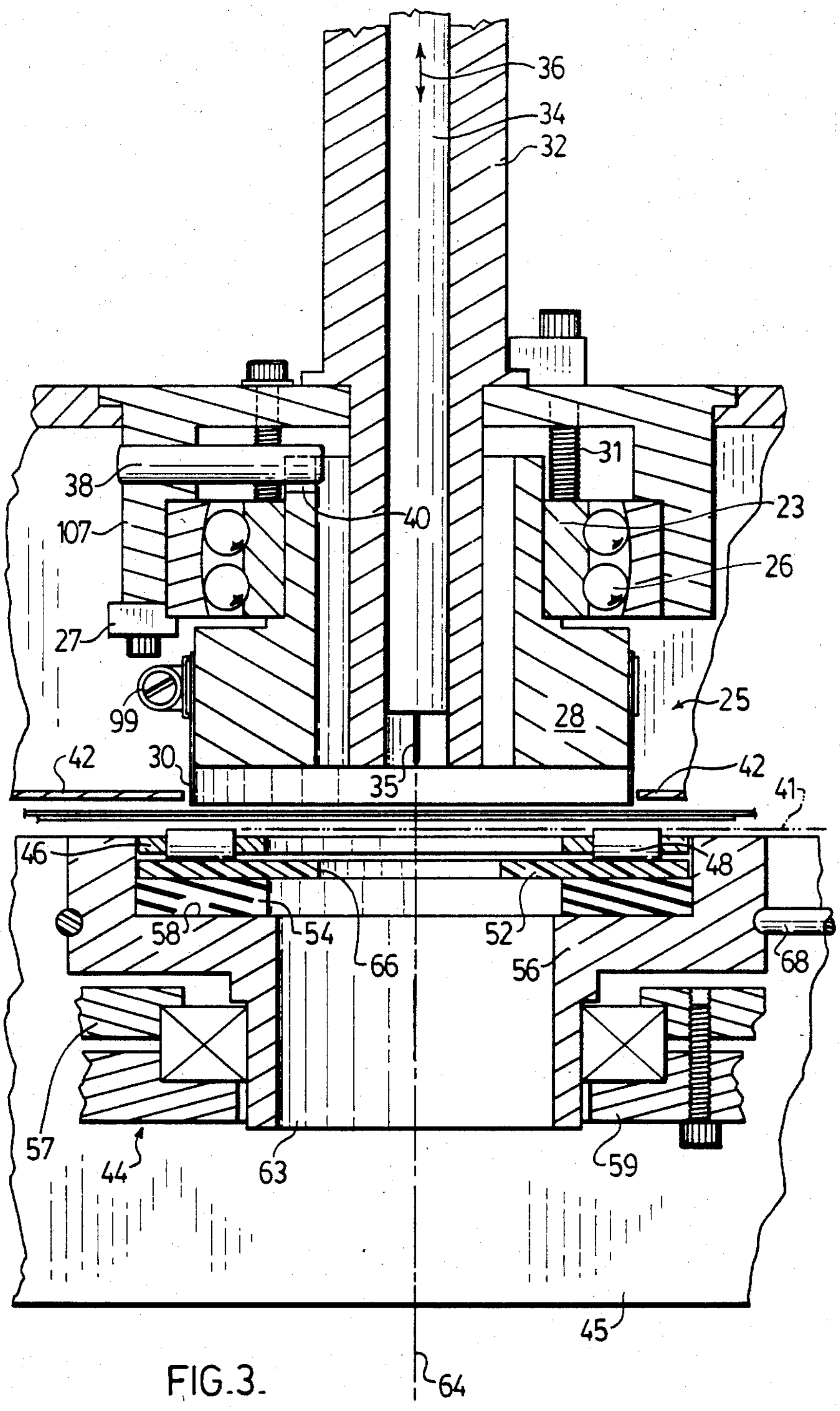
FIG. 3 is a partial side sectional view of the cutting apparatus of the present invention.
Figure 4:
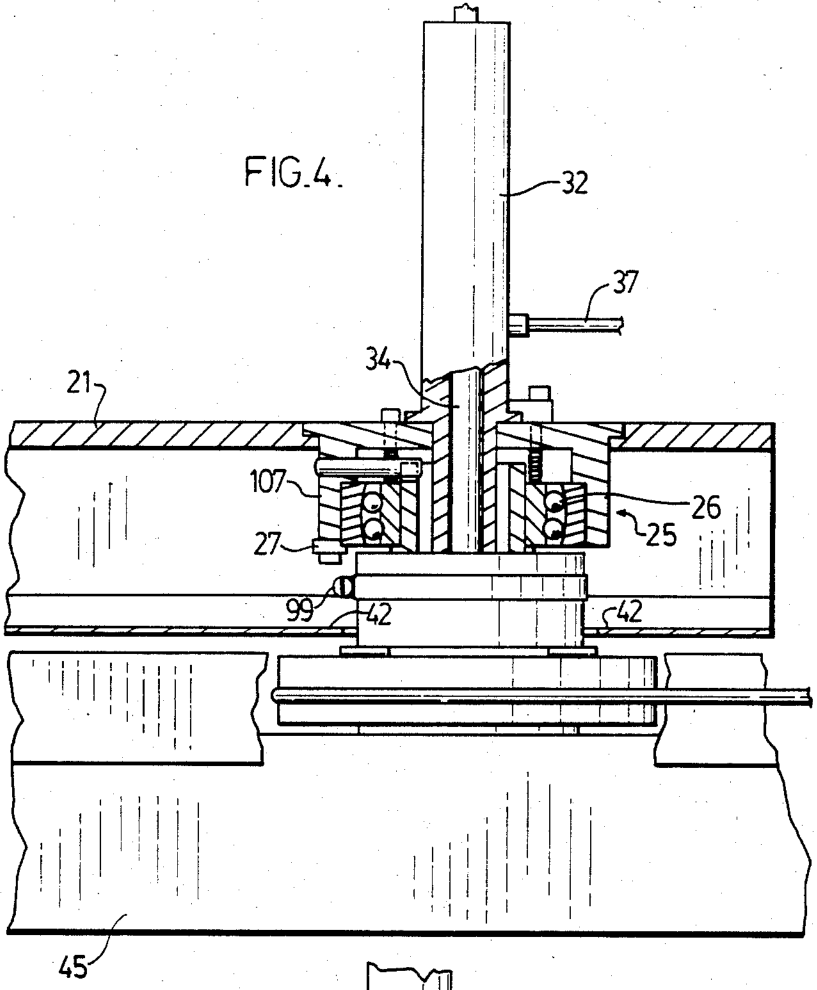
FIG. 4 is a partial side sectional view of the cutting apparatus of the present invention.
Figure 5:
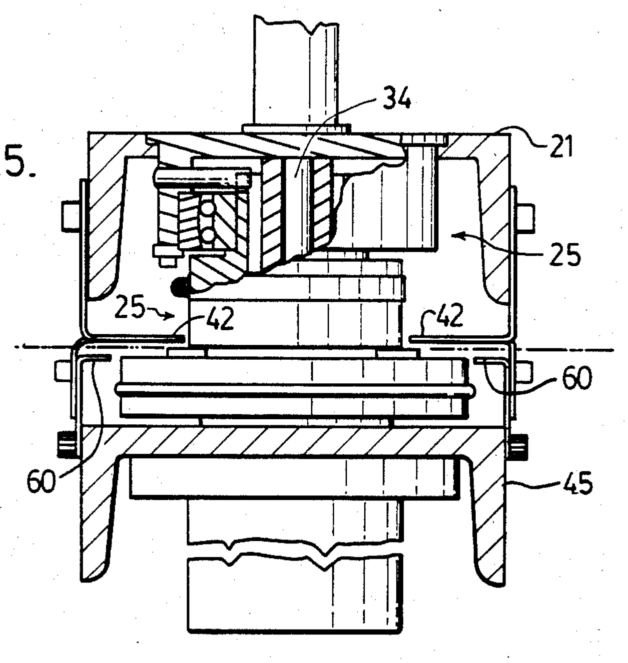
FIG. 5 is an end sectional view of the entire cutting apparatus of the present invention, except for its arms.

The cutting mechanism 25 comprises a cylinder 32 which is fixedly mounted on arm 21 to extend normally therethrough in the manner shown in the drawings, particularly FIG. 3. Within cylinder 32 a piston 34 is mounted to move reciprocally therethrough in the direction of the arrow 36 when actuated by a pneumatic source supplied through hoses 37. On the end of piston 34 a prick 35 is mounted. The end of prick 35 is flush with the lower surface of a cutter blade support 28.

A cutting blade 30 is mounted on cutting blade support 28 by means of a gear clamp 99. Cutting blade support 28 is connected through bearing 26 and bearing cap 27 to arm 21. On arm 21 set screws such as 31 extend downwardly to engage the inner race 23 and set the attitude of the cutting blade 30 if desired.

Blade holder 28 is provided with a groove 40. This groove 40 engages one end of a pin 38. The other end of pin 38 is seated in a hole 39 in skirt 107 extending downwardly from 21. Groove 40 is dimensioned so that its horizontal width permits relatively tight engagement with pin 38 while vertically it is wider. This relationship restrains relative horizontal rotation between the blade support 28 and the cylinder 35 while permitting a limited rocking or gimballing movement.

The relative movement which has just been referred to permits the cutting blade 30 a measure of self-alignment or seating of itself relative to a horizontal web passing thereunder as will be further explained hereafter.

Further on arm 21 two opposed inwardly extending stripper plates 42 are mounted adjacent the cutting blade 30. These stripper plates serve to clear the web from the blade after each cut.

On the lower arm 45 a bearing assembly 44 is mounted in alignment with the cutting mechanism on upper arm 21. The upper surface of bearing assembly 44 provides a cutting surface.

The bearing assembly 44 includes a bearing cage 46 which supports cylindrical bearings 48 radially spaced about the central axis 64 of the bearing cage 46. Below bearing cage 46 there is a bearing support. This bearing support comprises an annular disc 52 of glass reinforced plastic or equivalent material such that it is flexible but rigid. Disc 52 in turn is sealed on an annular rubber pad 54, so that bearings 48 are substantially flush with respect to the upper surface of cutting plane 41. The bearing cage 46, disc 52 and pad 54 are seated within bearing cup 56. Bearing cup 56 is provided with an opening 63 which permits the cut coupon to pass therethrough. The pad 54 is secured to the floor 58 of cup 56 so that there is no relative slippage and disc 52 is seated on pad 54 so that it may compress the pad in response to pressure from the bearings 48. The bearing cage 46 is free to rotate within cup 56.

Bearing cup 56 is maintained in position on arm 45 by bearing caps 57 and 59. Two stripper plates 60 extend inwardly on opposed sides of arm 45.

The diameter of opening 66 in disc 52 is less than opening 63. This reduced diameter assists in stripping the coupon from the web after plunger 34 and prick 35 push it through.

Around bearing cup 56 a drive belt 68 passes. The drive belt 68 also passes round pulley 70 which is driven by an electric motor 72.

It will be apparent that, although the cutting blade is circular, other forms may be provided according to the geometry of the blade and bearings so long as the locus of the bearings provides a surface engageable with the cutting blade.

As the web 16 passes through the machine it is stopped so that the hole-cutting operation may be performed at the appropriate position. As illustrated in FIG. 2 with a bag having a sinusoidal handle form, two holes are cut simultaneously. The structure of these two stations are identical and of the structure just described.

Once the web travel stops upper arm 21 is moved by cylinder 105 in a rocking motion about pins 101 against the force of springs 102.

As arm 21 moves down, the cutting blade 30 comes into engagement with the web and the web is urged into contact with the bearings 48 on its underside.

Figure 6:
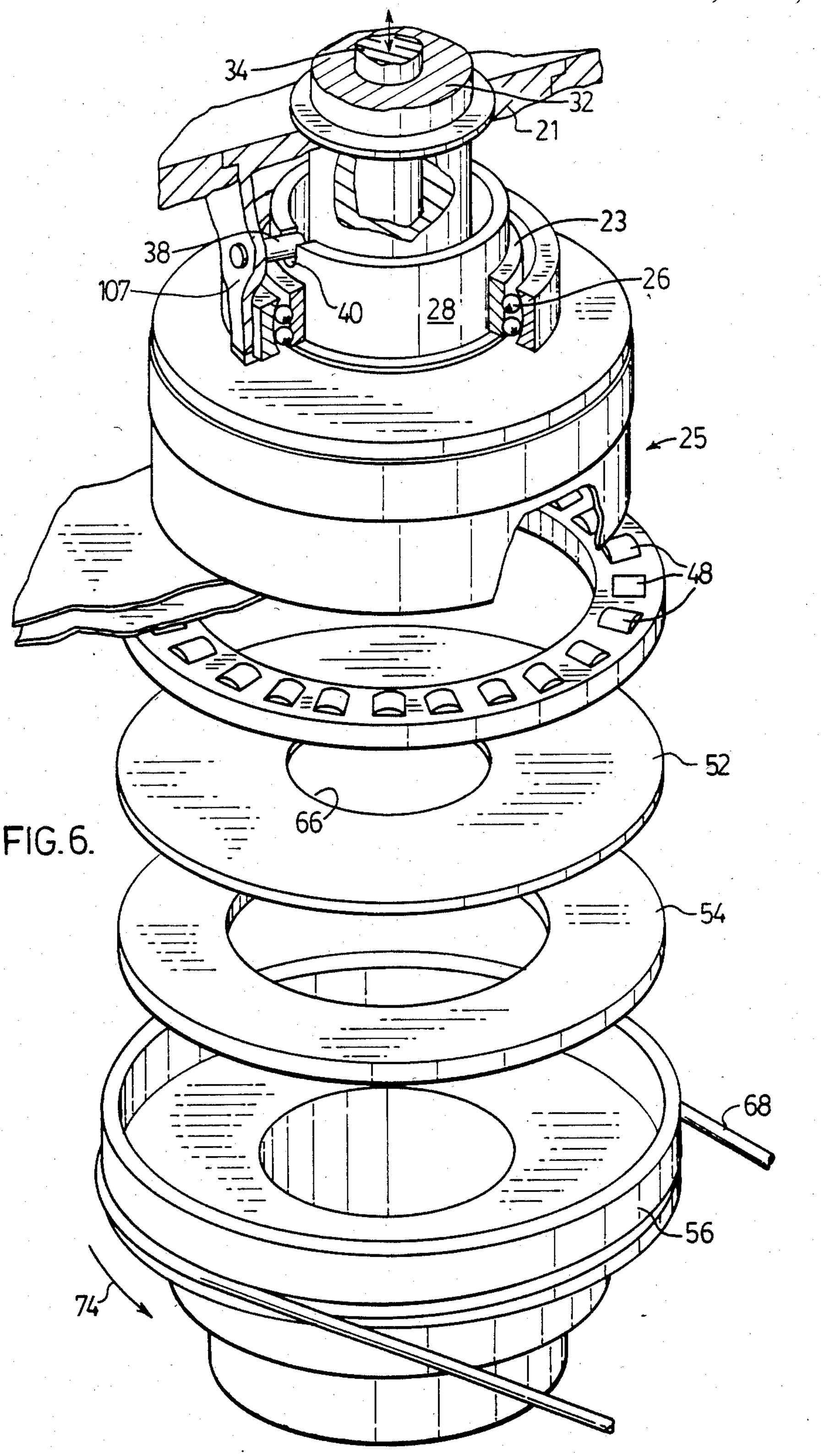
FIG. 6 is an exploded perspective view of the cutting apparatus of the present invention.

As the cutting blade 30 moves into engagement electric motor 72 is driving belt 68 to rotate the bearing cup 56 in the direction of the arrow 74 in FIG. 6. As the cutting blade 30 makes contact, blade 30 and the cutting blade support 28, through bearing 26, move relative to arm 21 so as to seat blade 30 in response to the reaction of the cutting surface and the roller bearings.

The cutting surface, at the same time, on the contact of the blade, web and rollers, responds to the downward pressure and the disc 52 and pad 54 on the urging of the rollers 48, accommodate the pressure.

These actions and reactions permit the blade and cutting surface to align themselves relative to each other. After the first cut the set screws 31 may, if desired, be screwed down to set the inner race 23 and limit the gimballing movement of holder 28 and the cutting blade 30.

As mentioned previously, the bearing cup is rotating as the blade 30 contacts the web and bearings 48. The reaction between the bearings 48 and the blade 30 on the one side and the bearings 48 and the disc 52 on the other side decelerates the roller bearing speed so that during cutting the roller bearings move at the half the speed of the bearing cup 56.

By these relative movements the coupon is cut and the travel of the bearing cage assembly to effect the cut is as 1/8 of a rotation.

When the cut has been effected piston 34 is actuated and prick 35 and piston 34 push the coupon through aperture 66 of disc 52. As the plunger 34 returns, the coupon is stripped by disc 52 from prick 35 and falls out through opening 63. The stripper plates 42 and 60 maintain the web spaced from the cutting surface and the cutting blade. Upon return of the plunger to its inactive position, the cylinder 105 is deactivated and the upper arm 21 returns to its normal rest position under the action of the springs 102.

From the foregoing it will be seen that a simple, fast, efficient mechanism has been provided for cutting coupons which have presented difficulties in the prior art.

I claim:

1. Apparatus for cutting coupons from a plastic web, said apparatus comprising;

a peripherally continuous cutting blade surrounding an axis, means for supporting the cutting blade, a cutting surface spaced apart from the cutting blade to permit passage of a plastic web to be cut therebetween, a bearing cage containing cylindrical bearings surrounding said axis and extending radially relative thereto to form said cutting surface, said cylindrical bearings being rotatable relative to said case about radial axes along which said cylindrical bearings extend, a bearing cap containing said bearing cage and permitting the bearing cage to rotate about said axes relative to said bearing cap, resilient means between said bearing cage and said bearing cap operable to resiliently yield when the cylindrical bearings engage the cutting blade, means for effecting relative movement along said axis between said cutting blade and said cutting surface to cause the cylindrical bearings to resiliently engage the cutting blade, and means for rotating the bearing cap about said axis to cause rotation of the cylindrical bearings about said axis to cut a coupon from plastic web between the cutting surface and cutting blade with the bearing cage rotating relative to the bearing cap to enable the rotational speed of the bearing cage to be less than that of the bearing cap.

2. Apparatus according to claim 1 wherein said resilient means between the bearing cap and the bearing cage comprises a solid body of resilient material.

3. Apparatus according to claim 1 wherein the bearing cage and bearing cap each have a central aperture, and the apparatus also includes means within the cutting blade movable along said axis to eject a cut coupon through the apertures in the bearing cage and bearing cap.

* * * * *